US00RE45549E

(19) United States
(12) Reissued Patent
Bock

(10) Patent Number: US RE45,549 E
(45) Date of Reissued Patent: Jun. 9, 2015

(54) AUXILIARY DEVICE AND METHOD FOR FINISHING PREFORMS

(71) Applicant: NESTAL-MASCHINEN AG, Näfels (CH)

(72) Inventor: Stefan Bock, Glarus (CH)

(73) Assignee: Netstal-Maschinen AG, Näfels (CH)

(21) Appl. No.: 13/689,361

(22) Filed: Nov. 29, 2012

Related U.S. Patent Documents

Reissue of:
(64) Patent No.: 7,887,320
Issued: Feb. 15, 2011
Appl. No.: 12/345,005
Filed: Dec. 29, 2008

U.S. Applications:
(63) Continuation of application No. PCT/CH2007/000319, filed on Jun. 28, 2007.

(51) Int. Cl.
*B29C 49/00* (2006.01)
*B29C 49/28* (2006.01)

(52) U.S. Cl.
CPC ..... *B29C 49/28* (2013.01)

(58) Field of Classification Search
USPC ..... 425/393, 444, 526, 534, 537
See application file for complete search history.

(56) References Cited

U.S. PATENT DOCUMENTS

| | | | | |
|---|---|---|---|---|
| 3,882,213 A | 5/1975 | Uhlig | ..... | 264/535 |
| 4,310,282 A | 1/1982 | Spurr et al. | ..... | 425/533 |
| 5,324,049 A * | 6/1994 | Mistrater et al. | ..... | 279/2.17 |
| 2005/0147712 A1 | 7/2005 | Pesavento | ..... | 425/533 |
| 2005/0194709 A1* | 9/2005 | Dunman | ..... | 264/101 |
| 2006/0138696 A1* | 6/2006 | Weinmann | ..... | 264/237 |

FOREIGN PATENT DOCUMENTS

| | | | | |
|---|---|---|---|---|
| EP | 0132159 * | 3/1990 | ..... | E21B 33/03 |
| EP | 0372671 A * | 6/1990 | ..... | B29C 49/06 |
| EP | 0813949 A1 * | 12/1997 | ..... | B29C 49/42 |
| EP | 0900135 B1 * | 11/2000 | ..... | B29C 45/72 |
| EP | 1312159 B1 * | 12/2005 | ..... | H03F 3/191 |
| WO | WO-02/051614 A1 * | 7/2002 | ..... | B29C 45/72 |
| WO | WO-2004/041510 A * | 5/2004 | ..... | B29C 45/72 |

* cited by examiner

*Primary Examiner* — James Sanders
(74) *Attorney, Agent, or Firm* — Henry M. Feiereisen LLC

(57) ABSTRACT

An auxiliary device and a method for finishing and calibrating preforms that are removed from a multiple tool in an unstable shape, the calibration process being performed with compressed air immediately after removing and withdrawing the preforms from the multiple tool. Nipples that can be inserted into the preforms are provided with expandable press rings or sealing rings in order to seal the interior of the blow-molded part of the preforms. The compressed air is introduced via the nipples, the sealing process being performed by radially expanding the press rings or sealing rings in analogy to the closing process of thermoses, thus protecting the preforms from adverse forces. The sealing point can be randomly selected in the transition zone from the threaded part to the blow-molded part of the preforms. The interior of the blow-molded part is optimally sealed without affecting the form stability and dimensional stability of the preforms.

20 Claims, 8 Drawing Sheets

"D"
"C"
"B"
"A"
24,25
23
19
X
Y
S
12'
16
17
10
P
12
18
11
26
4
6
5
8
9
2
3
7
21
27
1
EH
EV
Z 3
90
62
65
5
Z
67
7
X
Y
16
17
30
60
40
66
18
20
63
1
2
3
4

10
138
137
30

10x
136
137
KL
30

10xx
110
KL
137
30

10x
136
141
Sp
137

23
23
135
139
134
130
10x
131
141
132
X
112
133
Sp

AUXILIARY DEVICE AND METHOD FOR FINISHING PREFORMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

This application is a continuation of prior filed co-pending PCT International Application Number PCT/CH2007/000319, filed Jun. 28, 2007, which designated the United States and has been published, but not in English, as International Publication Number WO 2008/000108, and on which priority is claimed under 35 U.S.C. §120, and which claims the priorities of Swiss Patent Applications, Serial No. 1043/06, filed Jun. 29, 2006, Serial No. 121/07, filed Jan. 25, 2007, and Serial No. 759/07, filed May 9, 2007, pursuant to 35 U.S.C. 119(a)-(d), the contents of which are incorporated herein by reference in their entirety as if fully set forth herein.

BACKGROUND OF THE INVENTION

The present invention relates to an auxiliary device having a gripper with a plurality of nipples, each of which having an insertion part in sleeve-shaped parts, in particular for the after-cooling zone of injection molding machines for producing preforms, whereby the sleeve-shaped parts are embodied as cooling sleeves.

The invention further relates to a method for finishing preforms having a threaded part, a necking ring and a blow-molded part,

- which are removed from the open mold halves in a still hot and unstable state,
- wherein removal sleeves or cooling sleeves are transferred for exterior cooling,
- and which, after insertion, are pressed, by compressed air, onto the interior wall of the removal sleeves or cooling sleeves within the time period of an injection molding cycle and calibrated.

Up until two or three decades ago, a strict separation of two phases was performed for the production of preforms:

- Phase 1: The preforms are formed in mold halves by injection molding by means of a hot melt and cooled down in the molds until they can be transferred to an after-cooler without suffering any damage.
- Phase 2: The preforms are removed from the open injection molds and transferred to an after-cooler. In practice, three systems have prevailed:
- The still hot preforms are directly transferred to cooling sleeves of an after-cooler, which is conceptually similar to a removal robot. Thereby, the after-cooler has a multiple of cooling positions in relation to the number of preforms of an injection molding cycle.
- According to a second concept, the still hot preforms are removed from the open molds by a removal robot and transferred to an after-cooler.
- According to a third concept, the robot function is divided into a removal gripper with water-cooled removal sleeves and a transfer gripper for the transfer to an after-cooler.

In accordance with recent developments, attempts are made to substantially reduce the cycle time of the injection molding machine and to remove the preforms in a soft and unstable state. However, problems that were given less consideration previously have now come to the fore. Due to the physics of the cooling process, the cooling process is uneven within the walls of the preforms:

- As soon as the preforms are removed from the open mold halves, thermal stress in the preforms and deformations occur.
- Each engagement by robot-like grippers can lead to form damage.
- The same occurs when the preforms are situated horizontally in the after-cooler.

Thereby, each engagement in the context of the after-cooling process is extremely delicate work. A comparable example for this are robots with respect to handling raw eggs. The raw eggs must be securely held but, if possible, without applying local compressive forces that could result in breaking the egg shells.

In the production of injection-molded parts with injection molding machines, the cooling time is a determining factor for the time period of a full cycle. The first and main cooling performance still occurs in the injecting molds. Both injection mold halves are intensively water-cooled during the injection molding process so that the temperature of the injection molding parts still in the mold can be lowered from e.g., 280° C. to a range from 70° C. to 120° C., at least in the edge layers. In the outer layers, the temperature very quickly goes lower than the so-called glass temperature of about 140° C. In the recent past, the actual injection molding process time until removal of the injection-molded parts could be decreased to about 12 to 15 seconds in the case of preforms with thick walls, and to under 10 seconds in the case of preforms with thin walls, while maintaining optimal qualities with respect to the preforms. The preforms must be solidified in the mold halves to such a degree that they are captured without damage by the output auxiliary devices and transferred to a removal device. The removal device has a shape that conforms to the outer dimensions of the injection-molded parts. The intensive water-cooling in the injection mold halves occurs time-delayed from the outside to the inside, due to the physics of the cooling process. This means that the mentioned range from 70° C. to 120° C. is not uniformly achieved across the entire cross section. As a result, a quick backward-heating process from the inner area to the outer area occurs in the material cross section as soon as the intensive water cooling is interrupted by the molds. The after-cooling process is of utmost significance for two reasons. Deformations should be avoided until a stable storage state is reached. Surface defects such as pressure marks etc. should be avoided too. A cooling process that is too slow in the higher temperature range and locally harmful crystal formations due to the backward-heating process must be prevented too. The objective is a uniform amorphous state in the material of the finished preform. The rest temperature of the finished preforms should be so low that, in large packaging containers with thousands of loose poured-in parts, no pressure damage or adhesion damage can occur at the points of contact. Even after a slight backward-heating process, the injection-molded parts must not exceed a surface temperature of 40° C. The after-cooling process after removal of the hot, unstable preforms from the injection mold is very important for the dimensional stability.

WO 2004/041510 proposes an intensive cooling station as well as an after-cooler station and, for the intensive cooling station, cooling pins that can be inserted into the preforms for interior cooling. Thereby, the interior shape of the cooling sleeves conforms to the corresponding interior shape of the injection mold such that the preforms, after removal from the injection molds, can be inserted into the cooling sleeves until they fully contact the walls of the cooling sleeves, with as little play as possible. If the preforms are situated in a lying position in the first phase of the after-cooling process, then they tend to lay themselves in the downward direction onto the respective cooling sleeve part. Due to a more intensive cooling contact in the lower area, the preforms are cooled off more in the lower area so that stress occurs in the preform and so that the preform has a tendency of ovalization If, in the first phase of the after-cooling process with shortened cooling, individual preforms in the injection molds slightly deform, then the respective deformation cannot be corrected anymore while the preforms increasingly solidify. By well directed controlling of the vacuum air and blow air, an inflation pressure can be generated in the interior of the preforms, and the preform can fully contact the entire interior wall surface of the cooling sleeve. After the preforms completely contact the interior wall area of the cooling sleeves, the surface contact is maintained for several seconds and a calibration effect is generated for each individual preform. The calibration effect leads to a high production and quality standard in the production of preforms that was not possible in the previous state of the art. In this manner, the preforms are brought into an exact form again, shortly after removal from the injection molds. Possible dimensional changes are reversed again after the first critical handling of the injection molds in the cooling sleeves. The calibration of the preforms allows for removing the preforms from the molds at still higher temperatures and for achieving a shorter injection molding cycle time.

WO 2004/041510 proposes two solution variants for generating an inflation pressure. In accordance with a first variant, a sealing ring is arranged at a cooling pin and/or at a nozzle and brought in contact with the tapered transition in the interior of a preform. In accordance with a second variant, the nozzle has ring-shaped seals which contact the face of the opening edge of the preform. Here, the inflation pressure is exerted on the entire preform. It is a disadvantage of both solutions that, in practice, a very high precision for guiding and moving all nozzles is required in the case of multiple injection molds having, e.g., 100 to 200, mold cavities.

EP 900 135 proposes a concept that is analogous to the previously mentioned second solution variant. A certain compressive force and, in addition, a sufficient form rigidity of the threaded part is required in order to seal the opening edge. So as to avoid deformations of the threaded part, the preforms must be kept in the injection molds until a higher form rigidity is achieved. However, this conflicts with shortening the injection mold cycle time.

WO 02/051614 describes an exterior cooling of the threaded part of preforms. Thereby, cooling air was blown directly onto the threaded part by way of spray nozzles. In the context of a longer cycle time, however, the exterior cooling of the thread was not necessary.

It would therefore be desirable and advantageous to provide an improved auxiliary device to obviate prior art shortcomings and to allow engagement of nipples at the product in a robot-like manner and to ensure, in the case of sleeve-shaped parts, highest qualitative parameters and maximum form accuracy of the parts in the context of the after-cooling of the performs.

SUMMARY OF THE INVENTION

According to one aspect of the invention, an auxiliary device has a gripper with a plurality of at least one of calibration bolts and nipples, each having an insertion part for insertion into sleeve-shaped parts, wherein the sleeve-shaped parts are formed as cooling sleeves and wherein the insertion parts of the nipples have at least one of radially bulged press or sealing rings that are inserted into the sleeve-shaped parts. The auxiliary device includes a respective holding shoulder that is assigned to each of the at least one of press rings and sealing rings on both sides in axial direction of the insertion parts. Therein the holding shoulders are moved towards each other and in relation to each other for the bulging. Further, each nipple has two tube pieces at which ends a respective one of the holding shoulders is attached and the at least one of press rings and sealing rings is mechanically bulged in a manner analogous to a thermos bottle cap.

According to another aspect of the invention, a method for finishing preforms with a threaded part, a necking ring and a blow-molded part is provided, wherein the method includes removing the preforms from open mold halves in a still hot and unstable state; transferring the preforms to at least one of removal sleeves and cooling sleeves for an outer cooling; after insertion, pressing the preforms by compressed air onto an interior wall of the at least one of the removal sleeves and cooling sleeves within a time period of an injection molding cycle and calibrating; bulging at least one of press rings and sealing rings until contact with an interior wall of the preforms; sealing the interior of the blow-molded part towards the outside by generating a force that is directed radially in a direction of the interior wall; and inserting the at least one of the press rings and sealing rings attached to nipples for calibration, in a position-controlled manner, into each of the preforms in an area between the threaded part and the blow-molded part. Therein, at least one of a calibration bolt and a nipple has two tube pieces at whose ends a respective holding shoulder is attached that are moved towards each other and in relation to each other for the bulging and which mechanically bulge the at least one of the press rings and sealing rings in a manner analogous to a thermos bottle cap.

An auxiliary device according to the invention is characterized in that the insertion parts of the nipples have press or sealing rings that can be radially bulged and that can be inserted into the sleeve-shaped parts.

The method according to the invention for finishing preforms is characterized in that a) for the calibration, press or sealing rings attached to the nipples are inserted, in a position-controlled manner, into each of the preforms in the area between the threaded part and the blow-molded part, whereby
b) the press or sealing rings are bulged until contact with the interior wall of the preforms, and
c) the interior of the blow-molded part is sealed towards the outside by generating a radial force that is directed in the direction of the interior wall.

It has been recognized that an auxiliary device in the form of a robot-like gripper must operate for a variety of sleeve-shaped, unstable parts as precisely as the handling of raw eggs, in particular if the parts must be kept free of damage. Engaging the press or sealing rings must be designed such that no pressure marks and/or deformations can occur from the outset. The novel invention is similar to the concept of a thermos bottle cap, in which a hollow glass body must be closed. Thereby, sealed closure is achieved by rotation with the press ring.

In addition, it has further been recognized that multiple fundamental functions must be achievable in the same manner, in particular for applications in the area of an after-cooling of the preforms. These are:

the mere gripping of the preforms and the removal from the cooling sleeves, the unplugging and plugging in subsequent cooling sleeves, the calibrating of the preforms via air pressure and if necessary, an active application of vacuum air and blow air.

With reference to the device, a plurality of insertion parts must be simultaneously inserted into the respective sleeve-shaped injection molded parts. Each position deviation of the gripper leads to problems with respect to an optimal inserting and placing of the press or sealing rings.

Many conventional approaches with respect to the method failed to achieve the object of an as short as possible cycle time for a complete injection molding cycle. For example, in order for an air blowing device to generate a minimal effect for the interior cooling of the preforms at all, the air blowing device requires at least a few seconds of air blowing time. The injection molding process in the mold cavities requires at least 4 to 5 seconds. The dry run time of an injection mold is about 2 to 3 seconds. For a total cycle time of 10 seconds, a maximum of 2 to 3 seconds remain for air blow cooling, based on 2 to 3 seconds of dry run time. If the desired total cycle time for producing the preforms is even less, then there would be no more time for air blow cooling.

The present invention is based on the realization that, in a first approach, calibration can avoid the problems associated with very early removal of preforms from the open molds. The more unstable the preforms are, the more the above-described deformations occur. The softer the hot preform still is, the smaller the required inflation pressure for restoring complete form accuracy. However, the softer the hot preform still is, the less local dents must be generated because they, in turn, can cause negative pressure marks or even deformation.

The solution according to the invention avoids the described disadvantages in the state of the art. At least in accordance with preferred embodiments, longitudinal forces in the direction of the preform wall are not transferred by the press or sealing rings and pressure marks are not generated. The novel solution is based on the concept of a thermos bottle cap. The delicate wall material is common to both applications. In one case, it is glass; in the other case, it is the plastic that is still easily deformable. The sealing point does not have to be determined with highest precision but can be slightly optimized. The cooling efficiency increases to a maximum due to the transfer of the preforms from the injection molds to the removal sleeves and the immediate saturated insertion of the preforms into the removal sleeves. The novel inventive method seeks to maintain and restore maximum dimensional stability. Any deformations that occur during the transfer to the cooling sleeves until a sufficient form stability is achieved shall be reversed by the calibration. It is a core approach that everything is done so that the desired geometrical final form of the preform is achieved and/or restored with the highest possible precision and without pressure damage. The novel invention avoids interior air cooling and operates only with gripper forces that do not leave marks behind. It is the big advantage of the novel invention that a massive decrease of the entire cycle time and a corresponding performance increase of the injection molding machine of 20% to 30% is achieved while all quality criteria are fully met. The deformation of the preforms can occur even earlier, in an unstable state of the preforms.

Further investigations have shown that field trials of the inventive calibration for simple cylindrical preforms were successful. However, in practice, there is a wide variety of preforms, each of which can necessitate specific treatment.

Preforms that have a tapered neck base between the necking ring and the cylindrical blow-molded part have proven to be particularly delicate.

Preforms that have an enlargement in the respective neck part are also delicate.

In accordance with another advantageous feature of the present invention, the press or sealing rings may be slightly floatingly supported in their non-activated state with respect to the nipples. It is a fact that an injection molding machine per se does not have to be manufactured with highest precision. This is different from, e.g., the injection molding tools and from all of the functions to be performed by the injection molding machine. Each process must be performed with the highest precision. With respect to the press or sealing rings this means that they most have slight play for insertion into the interior of the parts and/or the preforms. Due to the slightly floating support, the press or sealing rings assume an optimal position within the preforms. During activation, each press or sealing ring contacts the interior wall in its optimal position. Thereby, angular pressure with corresponding negative forces is avoided, for example.

Each nipple can assume one or more of the following functions:

a sealing function for the calibration of the preforms, handling functions, e.g., for unplugging and plugging of the preforms or for the transfer to an after-cooler, the function for generating excess pressure or negative pressure in the preforms, a blowing function, if desired.

Two embodiments are proposed for the bulging of the press or sealing rings:

in accordance with the first embodiment, the press or sealing rings are mechanically bulged, analogously to the thermos bottle cap.

in accordance with the second embodiment, the bulging of a balloon-like press or sealing ring is accomplished via a pressure medium.

In accordance with the first embodiment, the press or sealing rings may be squeezed in-between two holding shoulders that are movable relative to each other. The sealing shoulders can be moved towards each other with the same stroke so as to avoid axial displacement. Despite massive reduction of the cycle time, the preforms can be after-cooled without damage. No forces are exerted that could be negative with respect to the preform wall. Numerous experiments have confirmed that a floating support of the press or sealing rings does not generate any pressure marks or damaging marks at the preforms, even in the case of fast movements. Advantageously, at least one of the two sealing shoulders is moved by a pneumatic piston. The movable holding shoulder is moved back by a return spring for the rest position of the press or sealing rings. In accordance with the device, each sealing ring of the nipples has its own pneumatic drive, whereby all press or sealing rings can be simultaneously activated.

The present invention has the advantage that the nipples are held by the friction being generated. Therefore, the force that results from the inflation pressure does not have to be absorbed via the machine. For the device embodiment, a simultaneous squeezing movement for 100 to 200 caps for the preform opening can be easily performed by a linear movement. This is true even more so as arbitrary forces in terms of the construction of the machine, be it hydraulic or electric forces, can be easily generated and not be transferred to the machine.

According to another feature of the present invention, the nipples may be inserted, in a position-controlled manner, into the preforms at a pre-selectable optimal sealing location in an area between the threaded part and the blow-molded part. This ensures that a wide variety of transition shapes between the threaded part and the blow-molded part can be taken into account. The best sealing location is sought at the beginning of each production. After inserting the nipples, the exterior wall of the entire preform-blow molded part must be in wall contact with the corresponding interior wall of the removal sleeve. Therefore, preferably, the preforms are already inserted into the removal sleeves during transfer by the removal sleeves until a complete and saturated interior wall contact of the entire blow-molded part, including the closed bottom part, has been achieved. During the time period of multiple injection mold cycles, the preforms are after-cooled in water-cooled cooling sleeves of an after-cooler, wherein the calibration is performed within the time period of an injection molding cycle and/or limited by the time period of the injection molding cycle.

According to another feature of the present invention, each nipple may have two tube pieces that can be moved relative to each other, each end of which having a holding shoulder is securely arranged thereon. For both above-described solution approaches, each nipple has air channels, via which, in a controlled manner, compressed air can be inserted into the interior of the blow-molded parts of the preforms. The actuator-plate is moved in relation to the platform by controlled displacement means so as to simultaneously activate the press or sealing rings. During calibration, the displacement means assume a pure support function. The press or sealing rings keep at the interior side of the preform in a squeezed state. Only a small force of the displacement means for the actuator-plate is sufficient for good sealing. Advantageously, the nipples are arranged, via a common actuator plate, at a platform via which the inwards movement and the outwards movement of the nipples into and out of the preforms, respectively, as well as the positioning of the nipples within the removal sleeves is performed. To this end, controlled drive means are assigned to the platform so as to position the press or sealing rings in a normal penetration depth and/or at an optimal location.

According to another feature of the present invention, the preforms may be removed from the removal sleeves and transferred to the cooling sleeves of an after-cooler when sufficient form stability is achieved but within the time period of an injection molding cycle. After calibration, the press or sealing rings can be relaxed and the pressure in the interior of the blow-molded parts can be released. Via the air channels, negative pressure can be generated via the nipples and the preforms can be transferred to the after-cooler by means of the nipples. Hereby the nipple does not have a cooling function. Preferably, there is no air exchange between the interior of the preform and the ambient air during the short calibration time period. The nipples have air channels, via which a negative pressure is generated in the preforms for preform removal. Within the nipples, the air channel for the compressed air and the vacuum air can be the same. Preferably, the tube pieces can be moved into each other, wherein the inner tube piece has at least one air channel. With respect to the concept of the first solution approach, the device has a first controllable removal gripper having a number of removal sleeves that matches at least the number of injection positions of the injection molds. The device is equipped with a controllable compressed air connector so as to generate an inflation pressure in the interior of the preforms for calibrating the preforms as well as a controllable connector for vacuum air, wherein the preforms are removable from the removal sleeves by the nipples after switching to negative pressure instead of the inflation pressure. In this concept, the device has a removal gripper, an after-cooler, and a transfer gripper for the transfer and/or the unplugging and plugging of the preforms from the removal gripper to the after-cooler for complete cooling of the preforms, independently of the injection molding cycle.

According to yet another feature of the present invention, the device may have an after-cooler that is embodied as a removal robot and that has a multiple number of cooling positions in relation to the injection positions of the injection molds. Thereby, the hot preforms to be transferred are inserted into respective free cooling positions, calibrated, intensively cooled and output after complete cooling. Here, by means of controlled vacuum air and compressed air, the nipples can support the outputting of the completely cooled preforms from the removal sleeves as well as the transferring of the completely cooled preforms to a conveyor belt. In accordance with the second embodiment too, the press rings and sealing rings are relaxed after calibration, the pressure in the interior of the blow-molded parts is released, and the nipples are moved outwards and held in a waiting position until the after-cooler is newly positioned for a new charge of preforms for the subsequent injection molding cycle.

Calibration of the preforms can be implemented by compressed air and limited in its time period by the injection molding cycle. The pressing and calibration of the still soft preforms has major advantages:

First, by the tight pressing of the exterior skin of the preforms onto the interior, water-cooled removal sleeve, maximum heat transfer and maximum cooling effects are ensured.

Second, the exterior dimensions of the preforms are exactly restored by the calibration, and are maintained during the subsequent form solidification.

Third, the physical quality parameters are ensured by quickly passing through the so-called glass temperature.

Fourth, due to generating a strongly cooled exterior material layer, sufficient form stability of the preforms for the subsequent handling of the removal sleeves in the cooling sleeves of an after-cooler as well as subsequent output onto a conveyor belt are achieved.

In accordance with another advantageous feature of the present invention, the water-cooled removal sleeves may have ventilation channels for corresponding exterior cooling of the respective preform area in the area between the threaded part and the blow-molded part and an air connector for the ventilation channels. Depending on the geometric shape of the preforms, the ventilation channels are arranged in the transition area between the threaded part and the necking ring and/or in the transition area between the necking ring and the blow-molded part. Preferably, the water-cooled removal sleeves are made of standardized parts such that, on a case-by-case basis, customized guiding rings for the ventilation channels can be used for cooling the transition area between the threaded part and the necking ring and/or the transition area between the necking ring and the blow-molded part.

With respect to the method, it is proposed to apply exterior air-cooling of the preforms in the area between the threaded part and the blow-molded part immediately after the transfer of the preforms to the cooling sleeves of the removal gripper until the end of the calibration. Preferably, for calibration purposes, press or sealing rings that are arranged at the nipples are inserted, in a position-controlled manner, into the preforms until the transition area between the threaded part and the necking ring or until the transition area between the necking ring and the blow-molded part. In combination, the preforms are already cooled from the outside after insertion into the cooling sleeves and during calibration from the outside in the transition area between the threaded part and the necking ring and/or until the transition area between the necking ring and the blow-molded part. It is an especially particular advantage that, still prior to the calibration at the critical support-less parts of the preforms and immediately after the transfer from the open mold halves to the cooling sleeves, the exterior skin of the preforms is immediately solidified harder so that the gripper forces have no negative effect on the respective areas.

In the case of preforms that have an expanding neck, the transition area between the threaded part and the necking ring is air-cooled from the outside. Here, the preforms are inserted until the necking rings contact the face of cooling sleeves, wherein the cooling sleeves are formed such that a gap of a few tenths of millimeters remains between the bottom part of the performs and the corresponding bottom part of the cooling sleeves that can be reversed by the calibration.

BRIEF DESCRIPTION OF THE DRAWING

Other features and advantages of the present invention will be more readily apparent upon reading the following description of currently preferred exemplified embodiments of the invention with reference to the accompanying drawings, in which.

DETAILED DESCRIPTION OF PREFERRED EMBODIMENTS

Figure 1:
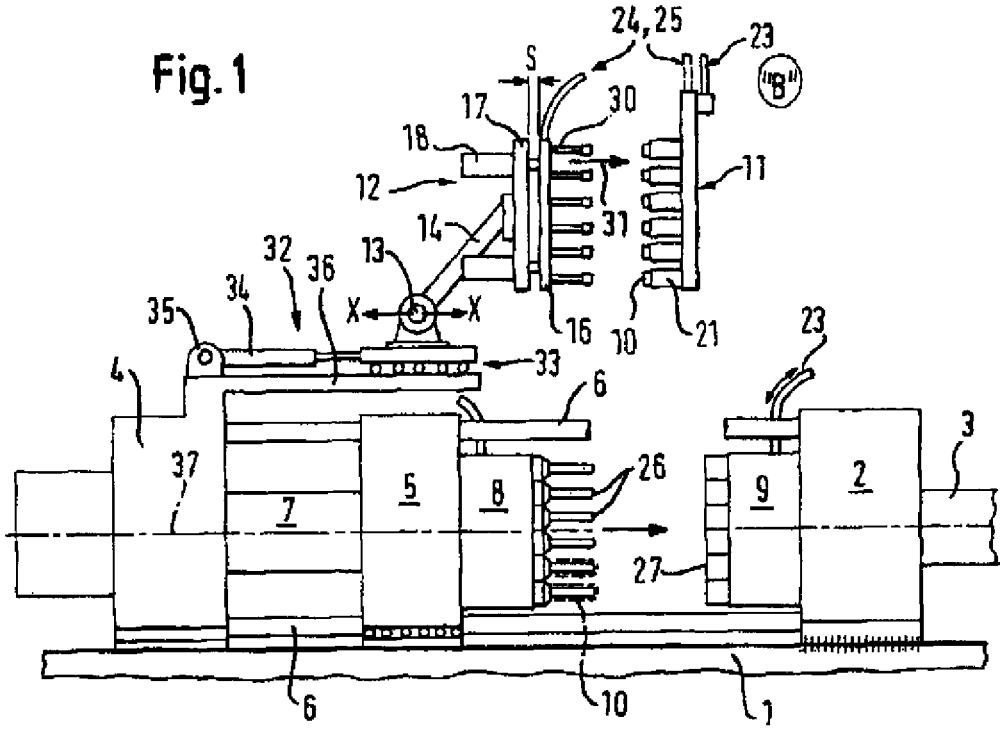
FIG. 1 is a schematic illustration of a device according to the present invention in standby position before calibration of preforms.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 5:
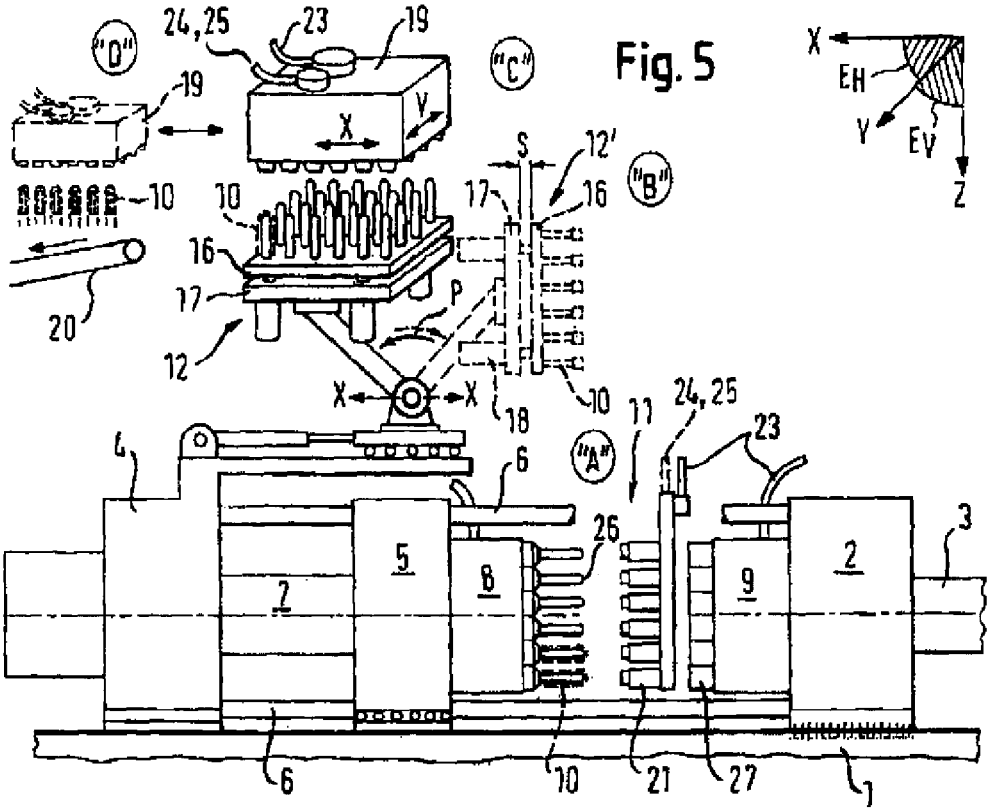
FIG. 5 is a schematic view of an example for a first solution approach having an additional after-cooler.

FIGS. 1 and 5 schematically show an injection molding machine for preforms with the following main elements: a machine bed 1, on which a support plate 4 and a fixed form platen 2 and an injection unit 3 are supported. A movable form platen 5 is axially movable and supported on the machine bed 1. The two plates 2 and 4 are connected with each other by bars 6 that are fed through the movable form platen 5. A drive unit 7 is arranged between the support plate 4 and the movable form platen 5 so as to generate closure pressure. The fixed form platen 2 and the movable form platen 5 each have a mold half 8 and/or 9, between which a multitude of cavities can be defined to produce a corresponding number of sleeve-shaped injection molded parts. The injection molded parts 10 are produced in the cavities between the bolts 26 and the cavities 27. After the mold halves 8 and 9 are opened, the sleeve-shaped injection molded parts 10 stick to the bolts 26. The same injection molded parts 10 are shown in the upper left part of FIG. 5 in a completely cooled state where they are in the process of being output from an after-cooler device 19. To illustrate the details better, the upper bars 6 are interrupted between the open mold halves. In accordance with the solution pursuant to FIGS. 1 and 5, the four method steps for the injection molded parts 10 after completion of the injection molding process according to a first solution approach are as follows:

"A" is the removal of the injection molded parts or preforms 10 from the two mold halves. A removal device 11 that is lowered in the space between the open mold halves receives the still malleable parts (FIG. 1) and lifts them into the position "B" (FIG. 5).

Figure 3A:
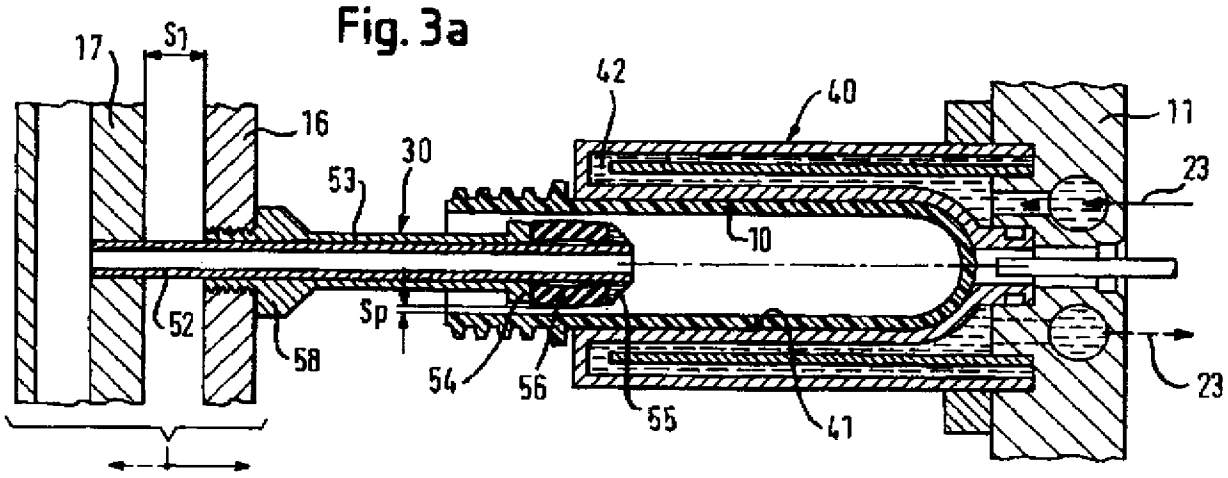
FIG. 3a is an enlarged sectional view of the detail of FIG. 2b.
Figure 3B:
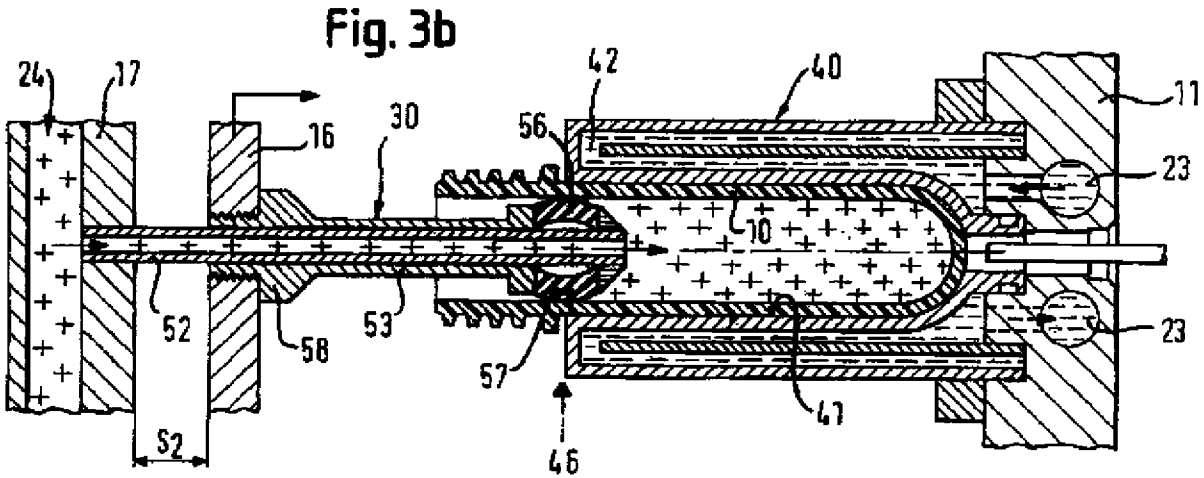
FIG. 3b is a sectional view of the nipple functioning as a calibration nipple with a press or sealing ring in a squeezed and/or bulged state, wherein the interior of the preform-blow-molded part is closed air-tight for adequate pressure build-up of, e.g., 0.5 bar.

"B" is the phase of calibration and intensive cooling (FIG. 3b).

"B"/"C" is the transfer of the preforms 10 from the removal device 11 to the transfer gripper 12 as well as the transfer of the preforms 10 from the transfer gripper 12 to an after-cooler device 19, in accordance with the first solution approach (FIG. 5).

"D" is the output of the cooled preforms 10 that were brought into a stable state from the after-cooler device 19 (FIG. 5).

Figure 4A:
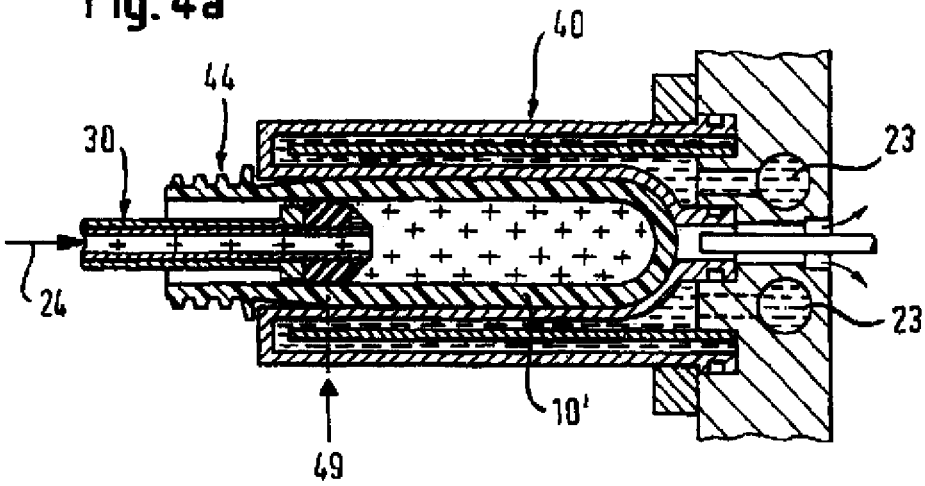
FIG. 4a is a sectional view of a differently configured thick-walled preform having corresponding positioning of the nipple and/or the sealing ring.

FIGS. 1 and 5 show snapshots, so to speak, of the main steps for the handling in accordance with the first solution approach. In the position "B", the vertically stacked injection molded parts 10 are received by the transfer gripper 12 and/or 12' and brought into a standing position, in accordance with phase "C", by pivoting the transfer device in the direction of the arrow P. The transfer gripper 12 has a platform 17 that is pivotable about an axis 13 and that supports an actuator plate 16, wherein the platform 17 and the actuator plate 16 are arranged at a distance parallel to each other. Via a drive and/or displacement means 18, the actuator plate 16 can be moved outwards and parallel in relation to the platform 17 so that, in the position "B", the sleeve-shaped injection molded parts 10 can be taken from the removal device 11 and moved into the after-cooler device 19 arranged above, in a position that is pivoted into the position "C". Each transfer is accomplished by changing the distance "S" between the actuator plate 16 and the platform 17. The still hot injection molded parts 10 are completely cooled in the after-cooler device 19 and, after moving the after-cooler device 19, output and thrown onto a conveyer belt 20 in the position "D". The reference numeral 23 designates the water cooling arrangement with respective supply lines and discharge lines, which, for simplification, are suggested by arrows and considered known. The reference numerals 24/25 designate the air side, whereby the reference numeral 24 refers to the "blowing in", i.e., the supply of compressed air, and whereby the reference numeral 25 refers to the vacuum, i.e., the air suction (FIGS. 4a and 4c).

FIG. 1 shows a situation after the removal device 11 is retracted from the open mold halves 8 and 9 and the beginning of the calibration and the intensive cooling. Thereby, the platform 17 with the nipples 30 is already in a standby position for the insertion movement into the preforms 10 in accordance with arrow 31. Via an arm 14, the platform 17 is supported on a displacement device 32 and linear guiding rails 33 on a support console 36 and moved parallel in relation to the machine axis 37 via a linear drive 34. The linear drive 34 is on its rear side anchored to a lug of the support plate 4. When the linear drive 34 is activated, the nipples 30 are moved towards or away from the removal device 11 (according to arrow 31). Displacement means 18 are assigned to the actuator plate 16 whose only function it is to squeeze and relax the press or sealing rings 56.

Figure 2A:
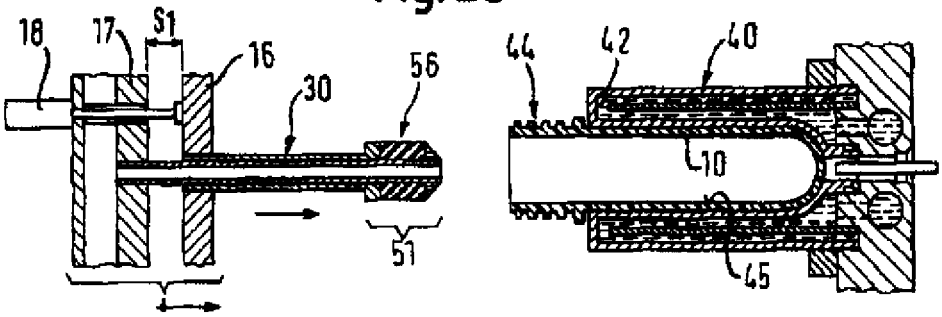
FIG. 2a is an enlarged sectional view of a detail, showing the start of an insertion movement of a nipple into a preform.
Figure 2B:
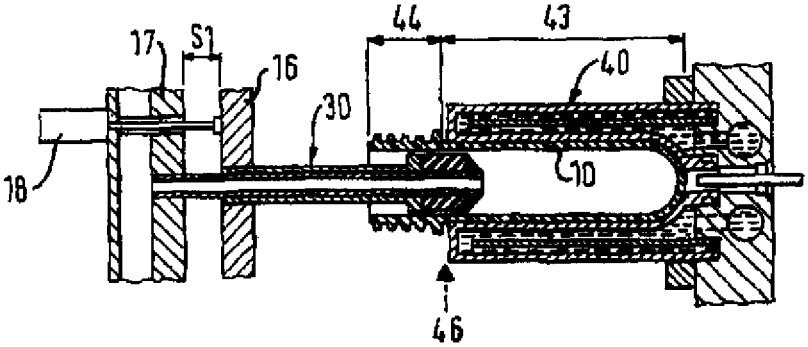
FIG. 2b is a sectional view of the detail of FIG. 2a, showing an optimal positioning of a nipple in an essentially cylindrical preform.

In the following, reference is made to FIGS. 2a and 2b: FIG. 2a shows the situation in accordance with FIG. 1, i.e., the start of the insertion movement of a nipple 30 into the preform 10 that is located in a removal sleeve 40. The blow-molded part 43 of the preform 10 snugly rests upon the interior wall 45 of the removal sleeve 40, including the closed bottom part. The threaded part 44 protrudes from the removal sleeve 40. With respect to the entire after-cooling of the preform 10, the threaded part 44 is less problematic than the blow-molded part 43. As a rule, the threaded part 44 has a handling function only in the subsequent methods steps (after-cooling process and blowing process). By contrast, maximum dimensional accuracy, both for the handling and for the blowing tool, is required from the blow-molded part 43. Due to the extended hollow shape, the blow-molded part 43 is much more in danger with respect to damage to its form. The short threaded part 44 is reinforced with threads. FIG. 2b shows a situation, in which the nipple 30 is inserted at an optimal sealing position 46. The optimal sealing position 46 is located at the open end of the removal sleeve 40.

FIGS. 3a and 3b illustrate a nipple's function as calibration bolts 30. FIG. 3a corresponds to FIG. 2b. Both show the end of the insertion movement of the calibration bolt and/or nipple 30 into the preforms 10. Sufficient play "Sp" exists between the blow head 51 and the interior form of the preform so that the blow head 51 can be inserted without damage to the surface of the preform's interior side. The entire calibration bolt 30 has a support tube 52 and a press sleeve 53 that can be longitudinally moved in relation to the support tube 52, wherein the press sleeve 53 has a press or sealing ring 56. Support bodies 54, 55 are arranged at the outer end of the support tube 52. A highly elastic rubber body and/or sealing ring 56, which, in essence, has a short cylindrical shape in its relaxed state, is located between the support bodies 54, 55. After the blow head 51 has reached its position 46, the press or sealing ring 56 is squeezed between the support bodies 54, 55 by mechanically moving the press sleeve 53 forward so that the press or sealing ring 56 bulges (FIG. 3b). Due to the bulging, a sealed closure is generated, analogous to the closure of thermos bottles. As soon as the sealed closure is generated, compressed air is blown into the interior of the preform 10 via the support tube 52 and minimal interior pressure is generated, which is indicated by the + sign. As a result of the interior pressure, the still malleable preforms 10 contact the interior surface of the cooling sleeves in a completely saturated manner and define an ideal heat transition. FIG. 3b shows the bulging of the rubber body and/or the sealing ring 56. The reference numerals 57, 57', 57" designate the sealing location at the sealing ring.

Based on the statements above, the following applies to the preforms 10 from the moment of removal from the open mold halves:

- best possible cooling circumstances at any time;
- aside from a brief interruption, the preform is pressed onto the interior cooling surfaces of the removal sleeves 40 immediately after shifting from the open mold halves into the cooling sleeves until insertion of the nipples during the calibration phase;
- the brief interruption for a 100% contact of the preform 10 is compensated for again by the calibration that takes much longer;
- after calibration, the preforms 10 are already in a stable state. Therefore, after the calibration, the preforms 10 stay dimensionally intact in their outer geometric form until they reach their completely cooled state.

If the water cooling circuits are extended to a maximum degree

- in the injection molds,
- in the area of the injection mold cavities and in the injection mold bolt as well as
- in the removal sleeve a maximum intensive effect is generated. Thereby, it is not the objective to completely cool the preforms 10 within an injection molding cycle. However, it is sought to bring the preforms 10 into a state that they can be dumped, stored and transported by the end of the after-cooling process, which is two to three times longer.

This leads to big advantages:

- the prerequisite for an extreme reduction of the cycle time,
- thus, a further increase in the productivity of the injection molding machine, maximum dimensional stability of the preforms, as well as the best possible qualitative characteristics of the preforms, e.g., with respect to crystallinity, dimensional stability and freedom from damage.

Figure 4B:
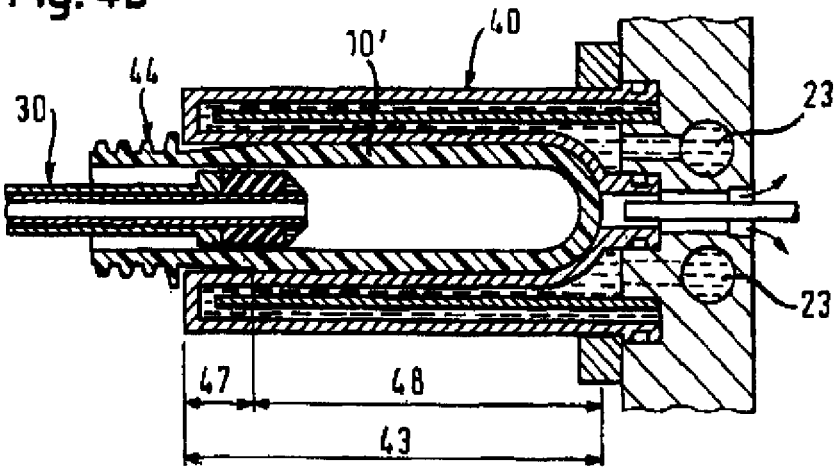
FIG. 4b is a sectional view of the thick-walled preform with the inflation pressure being released and the sealing ring being relaxed.
Figure 4C:
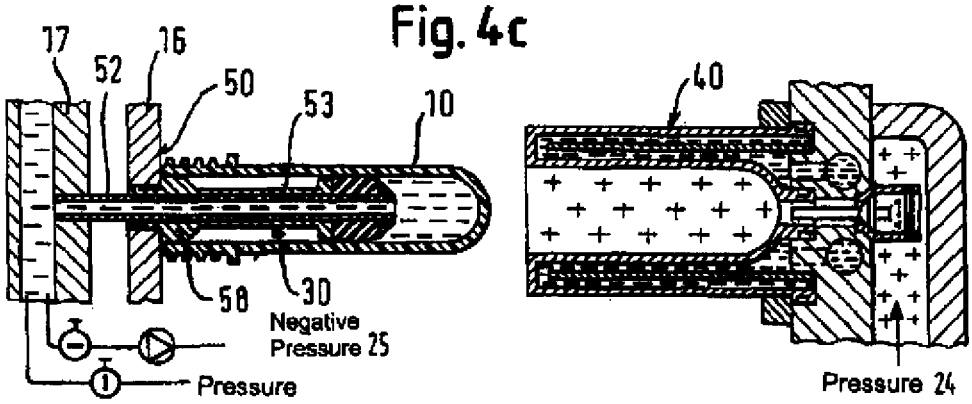
FIG. 4c is a sectional view, showing the removal of a preform by means of a nipple functioning as a holding nipple.

FIGS. 4a and 4b illustrate another exterior shape of a preform 10'. The preform 10' is a thick-walled preform, which has a tapered transition in the neck-like transition of the blow-molded part 43 to the thread. Because the perform 10' in inserted into and removed from the removal sleeve in the axial direction, a support for the corresponding blow-molded part 47 is missing in the area of the neck-like transition. Therefore, the nipple 30 is positioned at a sealing location 49 in the transition between the conical transition 47 and the cylindrical blow-molded part 48.

FIG. 4c shows the removal of preforms 10 from the removal sleeves 40 by means of the nipple 30 functioning as a holding nipple. Via the nipple 30, the interior of the blow-molded part is set to negative pressure and/or the preform 10 is sucked onto the nipple 30 (– sign). A centering ring 58 is arranged at the rear end of the support tube 52, which fits exactly the open end of the preform 10 and which holds the preforms precisely on the nipples 30. On the opposite side of the preform 10, compressed air is provided onto the closed preform end (+ sign). The preform 10 moves the actuator plate until the stop collar 50 and can be completely removed from the removal sleeve 40 and transferred to the after-cooler 19, for example, or output by switching to compressed air in accordance with the second solution variant.

FIG. 5 shows a station at the end of the injection molding process with open mold halves 8 and/or 9. The temperature of the preforms 10 was lowered in the tool with maximum cooling effect. The preforms 10 may very well still be unstable such that they can collapse under the effect of the smallest external force when they are immediately output after the mold opens. At the end of the injection molding process, the removal device is already in start position (FIG. 1). After the mold opens, the removal device can then be lowered between the open mold halves without time delay (FIG. 5). In the solution shown in FIG. 5, an independent after-cooler device 19 is used, in which the still hot preforms 10 are completely cooled during 3 to 4 injection molding cycles. A transfer gripper 12 transfers in the phase "B"/"C" of FIG. 5 the preforms 10 to the after-cooler device 19. The after-cooling of the preforms takes place in water-cooled sleeves.

In FIG. 5, the horizontal plane is referenced with EH and the vertical plane is referenced with EV. The horizontal plane EH is defined by the two coordinates X and Y, and the vertical plane is defined by the coordinates Y and Z. The Z coordinate is vertical and the X coordinate is transverse in relation thereto. The transfer gripper 12 performs a pivoting movement as well as a linear movement in the X coordinate. Additionally, the transfer gripper 12 can be formed with a controlled movement in the Y coordinate. Because the transfer gripper 12 already has a controlled movement in the X coordinate, the exact positioning of the preforms 10, which are located on the nipples 30 of the transfer gripper 12, in the X-direction can be performed by a correspondingly controlled/regulated movement. In this case, for the transfer of the preforms 10 to the after-cooler 19, the after-cooler 19 is driven to a fixed position in the X-direction and the transfer gripper 12 is controlled/regulated in the Y-direction and brought into the respective desired position. In the preferred embodiment, the movement means for the after-cooler 19 for the two coordinates X and Y can be controlled/regulated for the two coordinates X and Y for exact positioning for the transfer of the performs 10. Therein, the transport gripper 12 is put in a respective fixed transfer position.

In this context, reference is made to WO 2004/041510.

Figure 6:
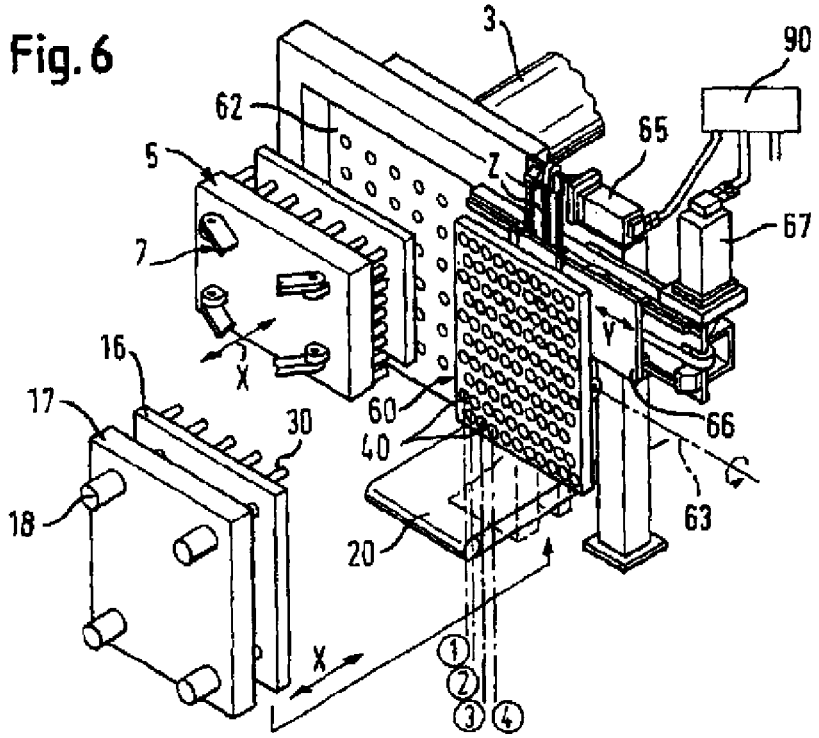
FIG. 6 is a schematic perspective view of an example for a second solution approach, in which the removal robot is embodied as an after-cooler.

It is another important aspect of the new method that the removal sleeves 40 have maximum circulation cooling 42 and that an optimal contact is made between the exterior side of the preform and the cooling cavity 41. Thereby, the preform 10 is evenly and forceably pressed into the cooling cavity 41 (FIG. 4b). The preform 10 is so far inserted into the cooling cavity 41 until the entire blow-molded part 43, including the bottom part, has saturated wall contract. FIG. 6 shows an after-cooler concept with compact construction according to the second solution approach. With respect to the injection molding machine, the solution can equal the solution of FIG. 5, which is why the same parts have the same reference numerals. An after-cooler 60 having a multitude of cooling sleeves 21 has a vertical transfer plane, i.e., a plane within the coordinates X and Y. In the illustrated position, the two mold halves 8 and 9 are in an open state so that the after-cooler 60 can drive into the free intermediate space 62 between the mold halves. The after-cooler 60 has a total of three movement axes, namely a horizontal movement axis in the Y-coordinate, a vertical movement axis in the Z-coordinate and a rotary axis 63 that can be coordinated by a machine control 90. The rotary axis 63 merely serves to output the completely cooled performs 10 onto a transport band 20. The rotary axis 63 is supported in relation to a base plate. The movement means for the vertical movement include a vertical drive 65. The vertical drive 65 is slideable on a base plate 66 of a horizontal drive 67. The horizontal drive 67 has an AC servomotor with a vertical axis. Via four sliding members, the base plate 66 is supported on two parallel slide rails so that the base plate 66 can be moved back and forth. On the right hand side of the drawing, the base plate 66 has a base plate part that extends vertically upwards at which the vertical drive 65 is anchored. The vertical drive 65 also has an AC servomotor with a horizontal axis.

The after-cooler device in accordance with FIG. 6 has multiple rows that are arranged parallel to each other. In the illustrated example, 12 cooling sleeves are shown in each vertical row. The cooling sleeves 21 can be arranged much closer with respect to the circumstances in the injection molded parts. Therefore, not only are multiple parallel rows shown but, in addition, an offset of the rows is proposed. This means that, for a first injection molding cycle, the cooling pipes are designated with the numerals 1; for a second injection molding cycle, the cooling pipes are designated with the numerals 2, etc. For example, if all rows with the numeral 3 are filled by four parallel rows, then the rows with the numerals I are prepared for output onto the conveyor belt 20, as described. The rest applies analogously to the entire production time. In the illustrated example, the entire after-cooling time is in the magnitude of three to four times the injection molding time. The air pressure conditions and/or the negative pressure conditions in the after-cooler device 19 must be controllable, row-by-row, so that, at a given point in time, all rows 1 and/or 2, etc. can be simultaneously activated. In addition to the accuracy of path regulation of the after-cooler 19 as well as the platform 17, it is important that the acceleration and delay functions are optimally controlled. Display takes place in a command device of the machine control, i.e., the machine computer 90. Any aspect of movement processes can be optimized. This refers to, for example, Start and Stop, but also, above all, to accelerations and delays with respect to velocity and path. FIG. 6 allows for another possibility of removing the preforms 10 from the after-cooler 19 and/or the removal robot 60. The preforms 10 can be removed from the cooling sleeves 21 by the nipples 30 and output onto the conveyor belt 20. With respect to the construction of the after-cooler 19, reference is made to EP 1 312 159.

It is an important aspect of the new solution that the preforms 10 are inserted into the removal sleeves 40 in a saturated manner until the closed bottom of the preform rests. The nipples 30 perform no function with respect to the insertion of the preforms 10 into the removal sleeves 40.

Figure 7A:
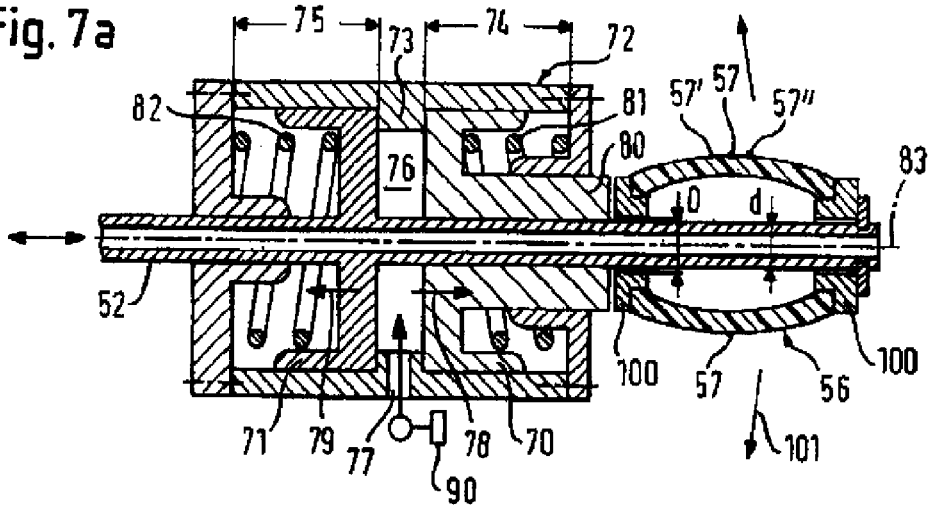
FIG. 7a is a schematic view of a solution with a mechanical/pneumatic activation of both holding shoulders with two pneumatic pistons.

FIG. 7a shows another embodiment for the bulging of the press or sealing rings 56. The stroke movement for the two holding shoulders 54, 55 is generated by two small pneumatic pistons 70, 71 that are arranged in a pneumatic cylinder 72. By a ring-shaped shoulder 73, the pneumatic cylinder 72 is divided into a front cylinder side 74 and a rear cylinder side 75. An air chamber 76 exists between the two cylinder sides, into which compressed air is supplied via a supply bore 77. The compressed air supply is supplied and/or released again via a control in the context of an injection molding cycle process. When compressed air is supplied, the pneumatic pistons 70, 71 are moved in accordance with arrows 78 and 79 so that the holding shoulders 54, 55 are moved towards each other by half a stroke via the connection piece 80 and so that the press or sealing ring 56 is bulged. Preferably, the press or sealing ring 56 is made of silicon rubber. The silicon rubber has enough elasticity and stable long-term. In order to ensure a clearly defined functioning of the press ring and/or the sealing ring 56 over a longer period of time, a return spring 81, 82 is provided for each pneumatic piston 70, 71, which, after each sealing phase, moves the press or sealing ring 56 back into the rest position. The holding shoulders 54, 55 assume a synchronization function for the entire gripper. As a result, the ring-shaped sealing locations 57 do not experience any displacement in the direction of the axis 83 during the active introduction of the sealing. Thereby, any local load in the longitudinal direction of the preform cross-section is avoided. If the return spring 81 is constructed somewhat stronger, a small pulling force is transferred to the preform 10 at the end of the calibration phase. This facilitates the start of the pulling movement.

Figure 7B:
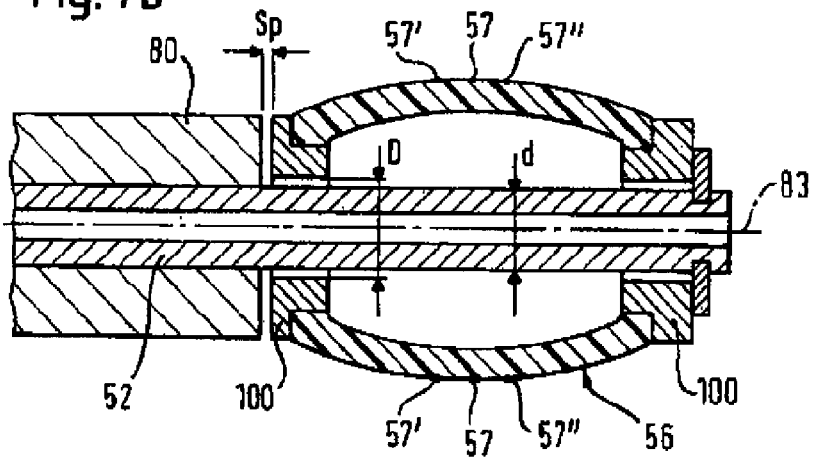
FIG. 7b is a schematic view of the nipple of FIG. 7a on an enlarged scale with a floatingly arranged press or sealing ring.

FIG. 7b shows an insertion part of the nipple 30 in accordance with FIG. 7a on a larger scale. The typical characteristic is the floating support of the press or sealing ring 56. Based on the investigations thus far, FIGS. 7a and 7b show the best shape of a nipple 30 with press or sealing rings 56. The press ring 56 is held on both end sides by means of loose support rings 100. The two lose support rings 100 have an inner diameter "D", which is larger than the outer diameter "d" of the support tube 52 by a small amount of play. In the longitudinal direction too, a play "Sp" exists between the support ring 100 and the connection piece 80. Thereby, the press or sealing ring 56 achieves a freedom of movement in its inactive state in the sense of a slight wobbling or floating according to arrow 101. This results automatically in an optimal ring-shaped sealing location 57, 57' or 57" at the press or sealing ring 56.

Figure 8:
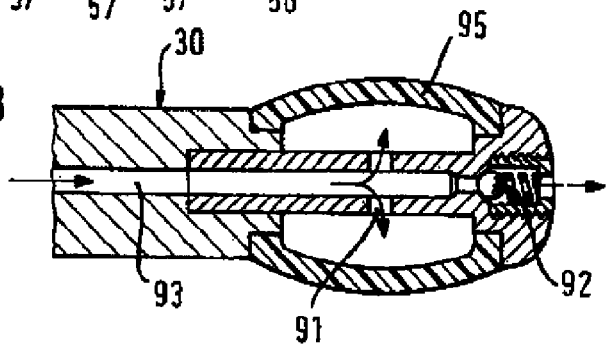
FIG. 8 is a schematic view of a solution with an inflatable press or sealing ring as well as a pressure relief valve for ensuring the inflation pressure in the press ring and/or the sealing ring.

FIG. 8 shows a nipple 30 with an inflatable sealing ring 95. Compressed air is supplied into the interior of the sealing ring 95 via a transverse bore 91 to the air channel 93 so that the sealing ring 95 bulges. To ensure a sufficient inflation pressure, a spring-loaded relief pressure valve 92 is arranged at the output end of the nipple 30. As soon as the interior pressure exceeds the set air pressure for the bulging of the sealing ring 95, compressed air is pressed into the blow-molded part of the preform 10 via the relief pressure valve.

Figure 9:
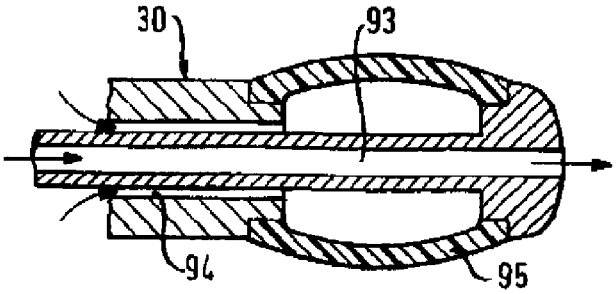
FIG. 9 is a schematic view of a solution with an inflatable press or sealing ring having two separate feeds for the pressure medium for the inflation pressure as well as for the calibration.

FIG. 9 shows a variant of FIG. 8. The pressure medium for bulging the sealing ring 95 is supplied via a separate air channel 94. Thus, the relief pressure valve is obsolete. The advantage of the solution in accordance with FIG. 9 is that two different media can be used for the sealing ring 95 and/or the inflation pressure. This can have advantages, for example, with respect to an additional cooling effect.

Figure 10:
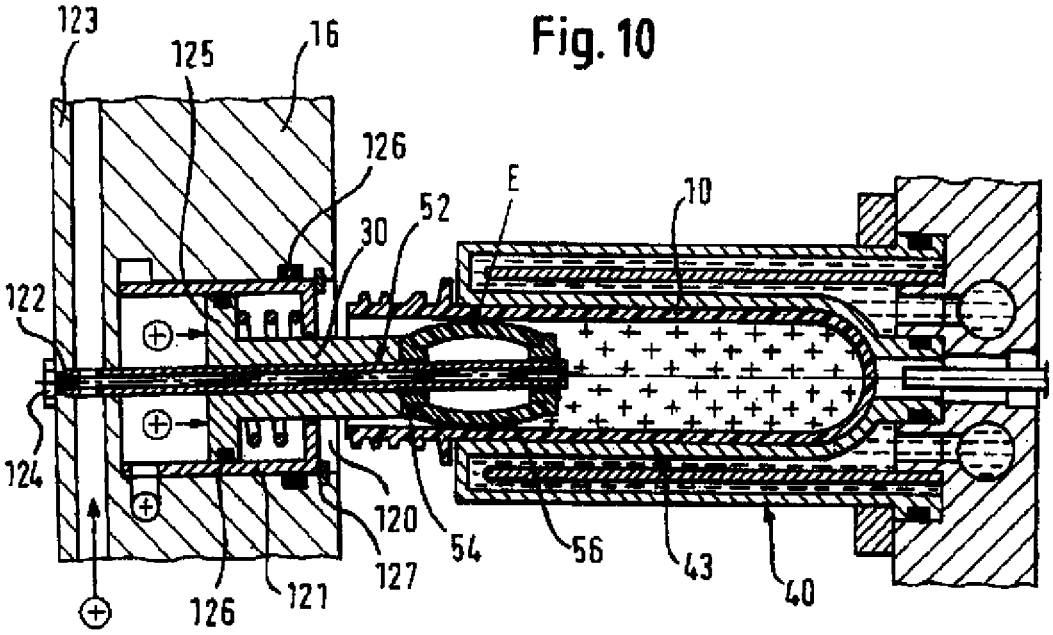
FIG. 10 is a sectional view, showing a nipple functioning as a calibration nipple that is positioned in a cooling sleeve having an exaggerated skewed position, wherein the sealing ring and/or the press ring is bulged, and showing a first embodiment of securing the nipple at the auxiliary device.

FIG. 10 illustrates in a completely exaggerated manner possible inaccuracies in the position of the nipple 30. The big advantage is that local pressure marks between the press ring and/or the sealing ring 56 and the preform 10 are avoided by this skewed position. The press or sealing ring 56 always conforms to the interior side of the preform.

FIG. 10 shows a nipple 10 in a completely exaggerated skewed position. As can be seen from the illustrated exaggeration, such a "skewed position" would have no negative effect since the press ring and/or the sealing ring 56 automatically adapts due to the above-described play. The optimal area for the press or sealing ring 56 in which an activation occurs is indicated by the letter "E". FIG. 10 shows the support of a nipple 30 at an actuator plate 16. A cylinder socket 121 is arranged in a bore 120 in the actuator plate 16. Via a landing 122, the inner tube 52 sits on a bottom plate 123 of the actuator plate 16 and is securely connected with a clamping screw 124. A pneumatically movable piston 125 is located within the cylinder socket 121. An outer tube piece 30 is connected to the piston 125. A holding shoulder 54 is connected to the end of the outer tube piece 30. The cylinder socket 121 and the tube piece 30 are sealed to the outside by a gliding ring 126. The tube piece 30 is pneumatically movable. By contrast, the cylinder socket 121 is fixedly held in the bore 120 via a spring ring and/or clamp ring 127.

Figure 11:
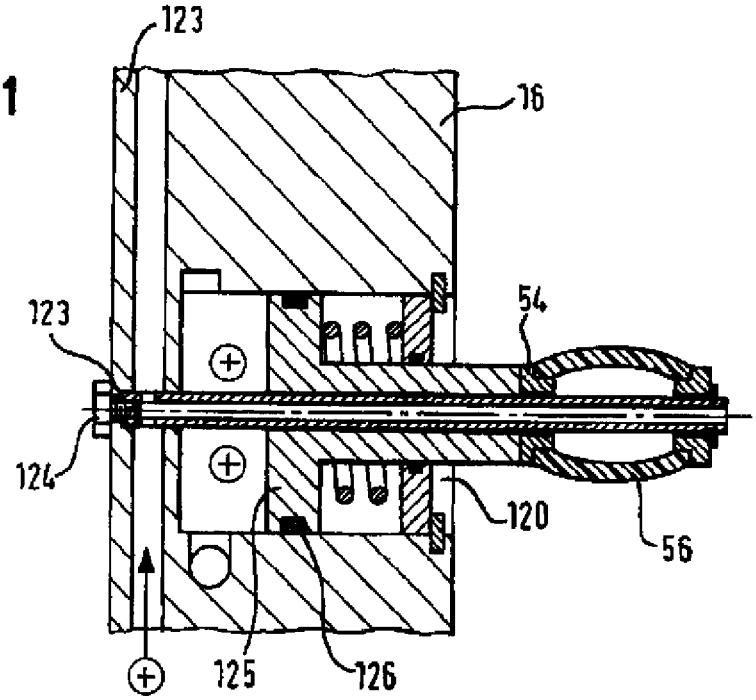
FIG. 11 is a sectional view of a second embodiment of securing the nipple at the auxiliary device.

The essential difference between the FIGS. 10 and 11 is that there is no cylinder socket in FIG. 11. The piston is movable directly in the bore 120 and guided in an airtight manner.

Figure 12A:
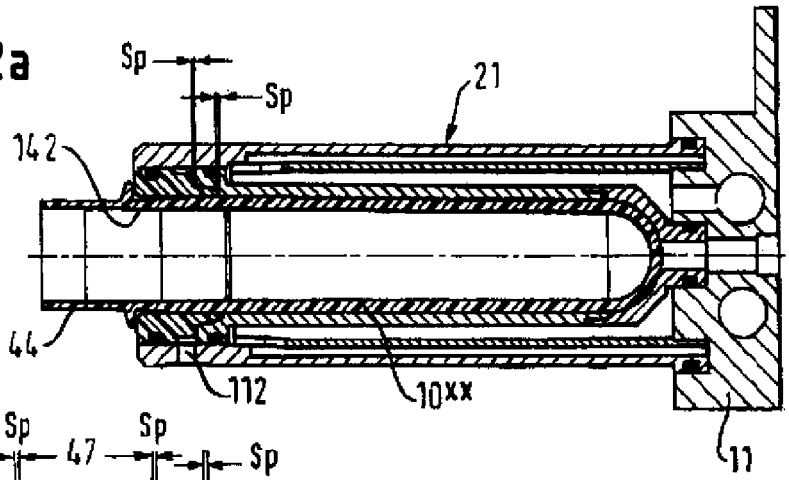
FIG. 12a is a sectional view, showing an exterior cooling of the transition area between the threaded part and the blow-molded part of the preforms.
Figure 12B:
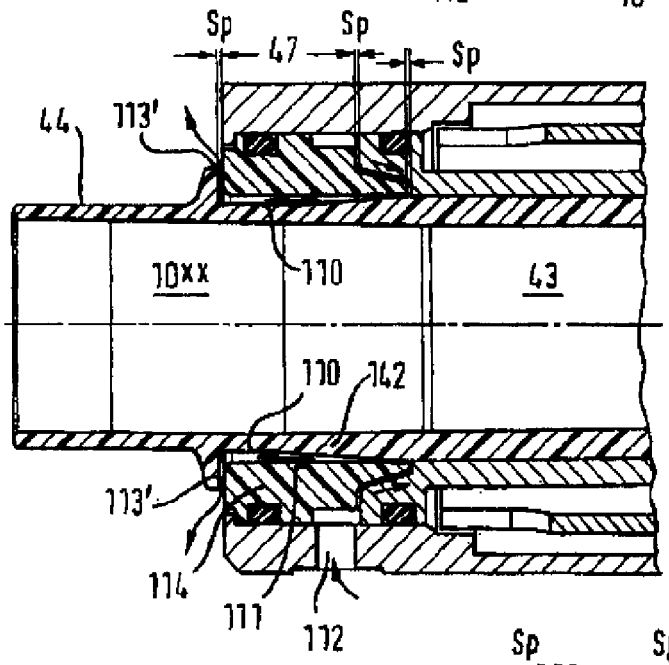
FIG. 12b is a partial section of FIG. 12a on a larger scale.
Figure 12C:
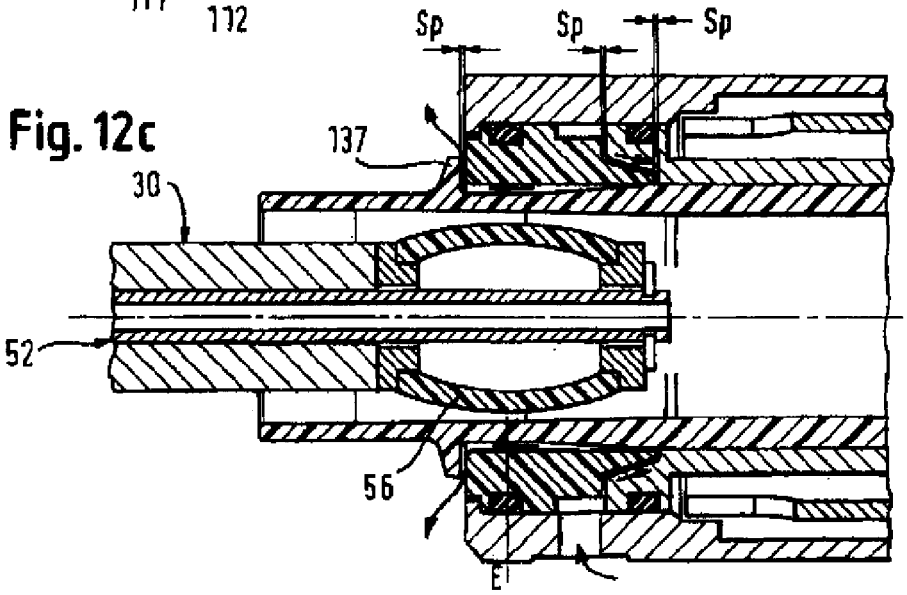
FIG. 12c is a sectional view, showing an optimally inserted nipple in accordance with FIGS. 12a and 12b.

FIGS. 12a, 12b, and 12c illustrate an outside cooling of the preforms 10 in the not uncritical transition 47 between the threaded part 44 and the blow-molded part 43 (FIG. 12b). Many preforms 10 have an exterior conical taper 110 in this section. In this sense, this conical taper 110 is disadvantageous because the section 47 of the taper has no support. There is no contact with the interior wall 111 of the cooling sleeves. Cooling air can be blown in via an air connector 112 and released to the outside again via a cooling channel 113, 113'. This additional cooling has the big advantage that it can be effectively used from the first moment of transferring the preforms 10 to the cooling sleeves 21 and, in addition, over the entire calibration time period. By additional reinforcement of the respective outer side of the preform, a possible deformation is countered due to the press force of the press or sealing ring 56. The most notable constructive difference to a "normal" cooling sleeve is that an air supply ring 114 is arranged in the open outlet area. At the inner side of the air guiding ring 114, a cooling channel is arranged around the respective preform part from the location of the air connector 112 to the release location 113' to the outside. Thereby, the cooling air is purposefully applied to the entire respective outer side of the preforms.

FIG. 12c shows the direct connection between the function of the nipple 30 as a calibration nipple and the section 47 of the preforms. The conical outer part of the preform 10 is immediately after the removal of the cooling sleeves specially cooled in advance and the outer wall layer is solidified. This gives the entire preform at the tapered transition 47 a higher form stability. The air guiding ring 114 is held towards the outside within the head part of the cooling sleeve 21. During assembly, the air guiding ring 114 with the inner sleeves of the cooling sleeve 21 is inserted from right to left in accordance with FIGS. 12a and 12b.

Figures 13A, 13B, 14A, 14B, 14C:
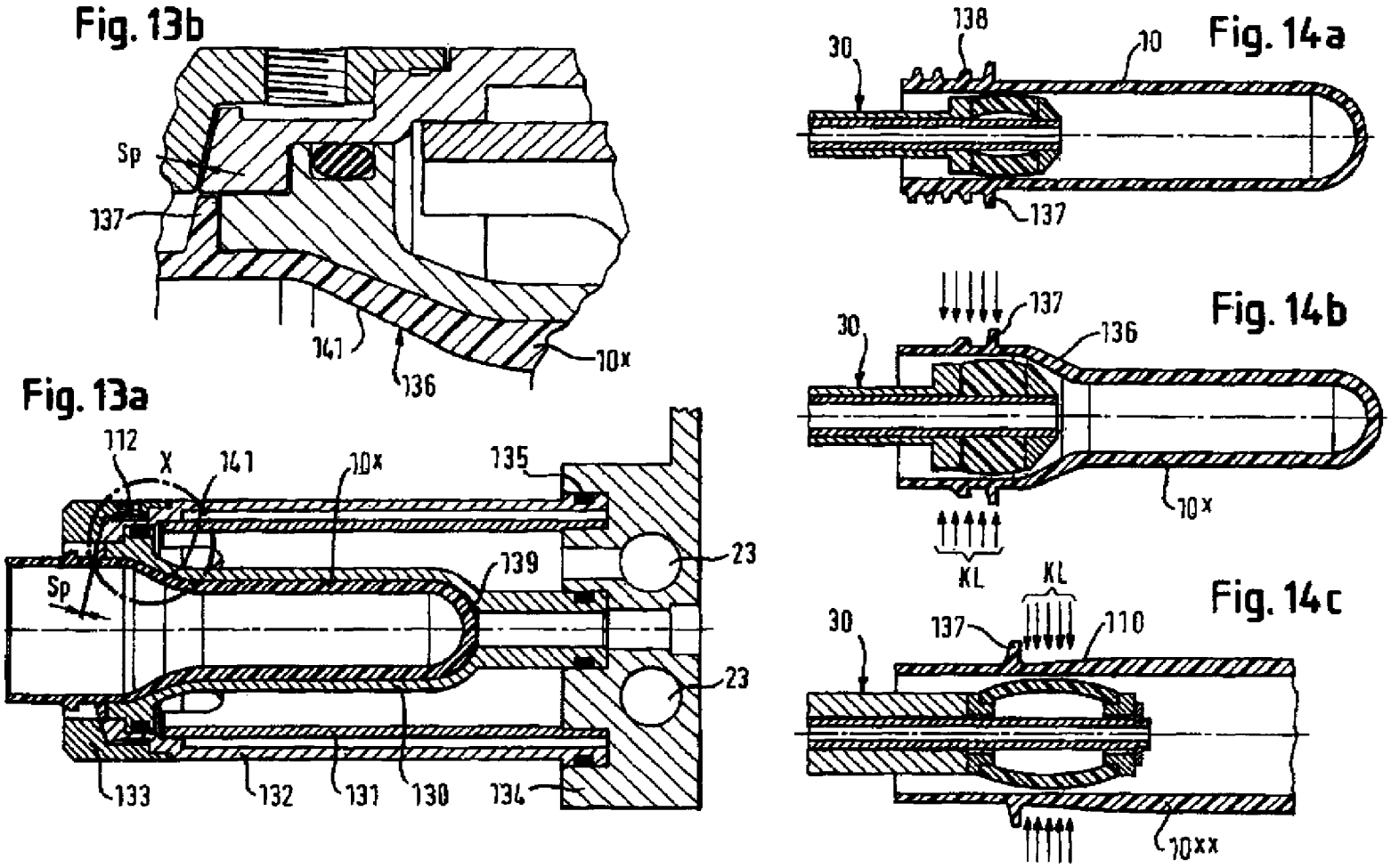
FIG. 13a is a sectional view, showing an exterior air-cooling at a preform having an expanding neck part.
FIG. 13b is an enlarged cutaway view of the area encircled in FIG. 1.
FIGS. 14a, 14b and 14c show schematic illustrations of an optimal insertion location of the press or sealing rings as well as the outside cooling, wherein, additionally, in the FIGS. 14b and 14c, an exterior air-cooling of the delicate non-supported is areas occurs.

FIGS. 13a and 13b show a preform 10x having a conically expanded neck piece 136. FIG. 13b is a section magnification "×" of FIG. 13a. In this type of preform, the expanded neck piece already belongs to the blow-molded part and contacts the interior wall of the cooling sleeve 130 during the calibration. The cooling sleeve interior wall gives the preform (10x) its definitive outer shape. The entire blow-molded part of the preform (10x) is in contact up until the necking ring 137.

The optimal sealing location of the press or sealing ring (56) is located in the area of the cylindrical section of the necking ring. Thereby, however, this part is jeopardized with respect to deformations during the bulging of the press ring and/or the sealing ring (56), since this part is not supported from the outside. Here, the additional exterior air cooling (KL) takes effect, as shown from FIG. 14b. Due to the air cooling in the area between the threaded part (44) and the necking ring, the outer skin of the preform (10x) has a somewhat higher rigidity because the corresponding blow cooling already occurs before calibration.

This applies in analogous manner to a solution in accordance with FIGS. 14b and/or 12c. By contrast, in the case of a cylindrical blow-molded part, exterior cooling can normally be avoided (FIG. 14a).

FIG. 13a shows another interesting embodiment idea. The cooling sleeve is assembled from standardized parts and has an interior cooling sleeve 130, an exterior cooling sleeve 121 and a casing sleeve 132 as well as a head ring 133, with which the air channels (gap SP) are formed. The interior cooling sleeve (130) is designed and a respective head ring 133 and/or 144 is attached, depending on the shape of the preform (10x). The lowest thread is designated with the reference numeral 138, and the base of the actuator plate and the sealing rings are designated with the reference numerals 134 and 1351 respectively.

In accordance with the example of FIGS. 13a and 13b, the cooling sleeve 10x is designed such that a minimal gap 139 of a few tenths of millimeters remains at the bottom part after insertion of the preforms into the cooling sleeves. By contrast, here the necking ring 137 already completely contacts the face of the cooling sleeve 130 during insertion.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An auxiliary device, comprising a gripper which includes a plurality of nipples, each nipple having [a support tube and] an insertion part which defines an axis and includes a press ring for insertion into a [sleeve-shaped part in the form of a cooling sleeve] *preform*; *and* two holding shoulders respectively disposed in a direction of the axis, [; and at least one support ring to hold the press ring, the at least one support ring having an inner diameter that is larger than an outer diameter of the support tube so as to floatingly support the press ring in a non-activated state with respect to an axis of the nipple;

wherein each nipple has two tube pieces, with one of the two holding shoulders being attached to an end of one tube piece, and the other one of the two holding shoulders being attached to an end of the other tube piece; and wherein the press ring is mechanically bulged in a manner analogous to a thermos bottle cap] *said holding shoulders being movable relative to one another, wherein the press ring is squeezable between the holding shoulders and mechanically bulgeable until the press ring contacts an interior wall of the preform in a manner analogous to a thermos bottle cap such that the interior of the blow-molded part of the preform is sealed towards the outside by generating a force that is directed radially in a direction of the interior wall of the preform*.

2. The auxiliary device of claim 1, wherein the auxiliary device is structured for the after-cooling area of an injection-molding machine for producing a preform.

3. The auxiliary device of claim 1, wherein [one of the] *each nipple has two* tube pieces, [is] *one of the tube pieces being* a [support-tube] *support tube* having an air channel for introduction of suction or compressed air into the [sleeve-shaped part] *preform*.

4. The auxiliary device of claim 1, further comprising a pneumatically actuated piston to move at least one of the holding shoulders from a rest position.

5. The auxiliary device of claim 4, further comprising a return spring urging the at least one holding shoulder to seek the rest position.

6. The auxiliary device of claim 2, wherein the press ring is structured as a radially inflatable sealing ring via which a sealing force in direction of an interior wall of the preform is generated for build-up of an inflation pressure inside a blow-molded part of the preform.

7. The auxiliary device of claim 2, wherein the preform is transferred in a hot and unstable state from an injection mold to a water-cooled removal sleeve for after-cooling, wherein the preform is calibrated with compressed air by the nipple inserted into the preform.

8. The auxiliary device of claim 1, further comprising a common actuator plate for attachment of the nipples; and a controlled drive operatively connected to the actuator plate for positioning the press ring at an optimal penetration depth or optimal location for the press ring in the preform or a removal cooling sleeve.

9. The auxiliary device of claim 1, further comprising a controllable removal gripper having water-cooled removal sleeves of a number that matches a number of injection mold positions of injection molds, wherein the water-cooled removal sleeves are constructed such that an entire blow-molded part of a preform is completely insertable into a removal sleeve with the exception of a threaded part and a necking ring.

10. The auxiliary device of claim 9, wherein the number of water-cooled removal sleeves is three to four times the number of injection mold positions.

11. The auxiliary device of claim 9 wherein the press ring is inserted into a preform in an area between the threaded part and the blow-molded part.

12. The auxiliary device of claim 9, wherein the water-cooled removal sleeves comprise ventilation channels in an area between the threaded part and the blow-molded part for respective exterior cooling of a preform, and further comprising an air connector for the ventilation channels.

13. The auxiliary device of claim 12, wherein, depending on a geometric shape of the preform, the ventilation channels are arranged in a transition area between the threaded part and the necking ring and/or a transition area between the necking ring and the blow-molded part.

14. The auxiliary device of claim 12, wherein the water-cooled removal sleeves are standardized parts so that guiding rings are used for the ventilation channels for cooling a transition area between the threaded part and the necking ring and/or transition area between the necking ring and the blow-molded part.

*15. The auxiliary device of claim 1, wherein the press ring is slightly floatingly supported in a non activated state with respect to an axial orientation of the nipple.*

*16. The auxiliary device of claim 1, wherein each nipple has two tube pieces, said two tube pieces being movable relative to one another, with one of the two holding shoulders being attached to an end of one tube piece, and the other one of the two holding shoulders being attached to an end of the other tube piece.*

*17. The auxiliary device of claim 16, wherein at least one of the tube pieces has an air channel for introduction of suction or compressed air into the preform.*

*18. The auxiliary device of claim 1, further comprising a common actuator plate for attachment of the nipples; and a controlled drive operatively connected to the actuator plate.*

*19. The auxiliary device of claim 1, further comprising a controllable removal gripper having water-cooled removal sleeves of at least a number that matches a number of injection mold positions of injection molds.*

*20. The auxiliary device of claim 19, wherein the water-cooled removal sleeves have ventilation channels for respective exterior cooling of the preform, and an air connector for the ventilation channels.*

* * * * *